(12) United States Patent
Sorace et al.

(10) Patent No.: US 11,594,954 B2
(45) Date of Patent: Feb. 28, 2023

(54) SOFT START METHOD FOR A SINGLE INDUCTOR MULTIPLE OUTPUT POWER SUPPLY

(71) Applicant: NXP B.V., Eindhoven (NL)

(72) Inventors: Christian Vincent Sorace, Falicon (FR); Nicolas Patrick Vantalon, Cannes (FR)

(73) Assignee: NXP B.V., Eindhoven (NL)

( * ) Notice: Subject to any disclaimer, the term of this patent is extended or adjusted under 35 U.S.C. 154(b) by 301 days.

(21) Appl. No.: 17/009,848

(22) Filed: Sep. 2, 2020

(65) Prior Publication Data

US 2021/0091665 A1 Mar. 25, 2021

(30) Foreign Application Priority Data

Sep. 19, 2019 (EP) ..................... 19306133

(51) Int. Cl.
*H02M 3/158* (2006.01)
*H02M 3/04* (2006.01)
*H02M 1/36* (2007.01)
*H02M 1/00* (2006.01)
*H02M 3/157* (2006.01)

(52) U.S. Cl.
CPC ............. *H02M 3/04* (2013.01); *H02M 1/36* (2013.01); *H02M 3/158* (2013.01); *H02M 3/1582* (2013.01); *H02M 1/009* (2021.05); *H02M 3/157* (2013.01)

(58) Field of Classification Search
CPC ........ H02M 3/04; H02M 3/156; H02M 3/158; H02M 3/1582; H02M 3/1586; H02M 1/009; H02M 1/32; H02M 1/36
See application file for complete search history.

(56) References Cited

U.S. PATENT DOCUMENTS

| 6,813,170 B2 | 11/2004 | Yang |
| 7,315,160 B2 | 1/2008 | Fosler |
| 8,427,123 B2 | 4/2013 | Dearborn |
| 8,975,879 B2 | 3/2015 | Xu et al. |

(Continued)

FOREIGN PATENT DOCUMENTS

KR 20100029930 A 3/2010

OTHER PUBLICATIONS

Chia-Min Chen, Kai-Hsiu Hsu, Chung-Chih Hung; "Freewheel charge-pump controlled single-inductor multiple-output step-up DC-DC converter"; Nov. 15, 2012; Springer Science+Business; pp. 216-225 (Year: 2012).*

(Continued)

*Primary Examiner* — Thienvu V Tran
*Assistant Examiner* — Shahzeb K Ahmad
(74) *Attorney, Agent, or Firm* — Daniel D. Hill

(57) ABSTRACT

A method is provided for soft starting a single inductor multiple output (SIMO) power supply. The method includes selecting operation in a pulse width modulation (PWM) mode. A first pulse frequency modulation (PFM) mode is enabled to supply a first load with a first voltage and the power supply begins to ramp up the output voltage. After the output voltage has reached a desired value in the PFM mode, the PFM mode is disabled. Then, operation is enabled in the PWM mode. The SIMO power supply then supplies a current to one or more loads in the PWM mode.

18 Claims, 18 Drawing Sheets

(56) References Cited

U.S. PATENT DOCUMENTS

| | | | |
|---|---|---|---|
| 9,018,923 B2 | 4/2015 | Parkhurst et al. | |
| 9,484,800 B2 | 11/2016 | Faingersh et al. | |
| 10,044,271 B1* | 8/2018 | Assaad | H03K 4/06 |
| 2011/0156684 A1* | 6/2011 | da Silva | H03K 7/08 |
| | | | 323/284 |
| 2013/0249507 A1* | 9/2013 | Kim | G05F 1/10 |
| | | | 323/247 |
| 2015/0061625 A1 | 3/2015 | Chen et al. | |
| 2015/0311791 A1* | 10/2015 | Tseng | H02M 3/158 |
| | | | 323/271 |
| 2019/0103766 A1 | 4/2019 | Von Novak, III et al. | |
| 2020/0076298 A1* | 3/2020 | Jung | H02M 3/1584 |
| 2020/0244167 A1* | 7/2020 | Delano | H02M 3/1582 |

OTHER PUBLICATIONS

Le, Hanh-Phuc, et al.; "A Single-Inductor Switching DC-DC Converter with Five Outputs and Ordered Power-Distributive Control;" IEEE Journal of Solid State Circuits; vol. 42, No. 12; Dec. 2007.

Ma, Dongsheng et al.; "A pseudo-CCM/DCM SIMO switching converter with freewheel switching"; Published in: 2002 IEEE International Solid-State Circuits Conference. Digest of Technical Papers (Cat. No. 02CH37315); Jun. 2003.

Moon, Young-Jin et al.; "Load-Independent Current Control Technique of a Single-Inductor Multiple-Output Switching DC-DC Converter"; IEEE Transactions on Circuits and Systems—II: Express Briefs, vol. 59, No. 1; Jan. 2012.

Salimath, Arunkumar et al.; "An 86% Efficiency Simo DC-DC Converter with One Boost, One Buck, and a Floating Output Voltage for Car-Radio"; ISSCC 2018, Power-Converter Techniques; Session 27.3.

Zhang, Yi, et al.; "A Fast-Response Hybrid SIMO Power Converter with Adaptive Current Compensation and Minimized Cross-Regulation"; IEEE Journal of Solid-State Circuits; vol. 49, No. 5; 2014; Feb. 14, 2018.

Chen, Chia-Min et al.; "Freewheel Charge-Pump Controlled Single-Inductor Multiple-Output Step-up DC-DC Converter;" Analog Integrated Circuits and Signal Processing; vol. 74, Issue 1, Nov. 15, 2012; https://doi.org/10.1007/s10470-012-9982-9.

Prieto, Maria Bella Ferrera et al.; "New Single-Input, Multiple-Output Converter Topologies: Combining Single-Switch Nonisolated dc-dc Converters for Single-Input, Multiple-Output Applications;" IEEE Industrial Electronics Magazine, vol. 10, Issue 2, Jun. 22, 2016; DOI: 10.1109/MIE.2016.2550000.

* cited by examiner

SOFT START METHOD FOR A SINGLE INDUCTOR MULTIPLE OUTPUT POWER SUPPLY

CROSS-REFERENCE TO RELATED APPLICATIONS

This application claims priority under 35 U.S.C. § 119 to European Patent Application No. 19306133.0, filed on Sep. 19, 2019, the contents of which are incorporated by reference herein.

BACKGROUND

Field

This disclosure relates generally to electronic circuits and more specifically to a soft start method for a single inductor multiple output (SIMO) power supply.

Related Art

Integrated circuits require at least one DC voltage supply and typically require more than one DC voltage supply. A single inductor multiple output (SIMO) is a switch mode power supply that generates two or more regulated DC output voltages using only one inductor and a feedback control circuit. Various modulation techniques are used in the design of switch mode power supplies. One scheme uses pulse width modulation (PWM). The PWM scheme uses a clock having a fixed frequency that is applied to switches of the switch mode power supply to supply the loads. Typically, a PWM converter is used for applications requiring high efficiency at heavy loads.

During a SIMO start-up sequence, inrush current may be high enough to cause an overcurrent or overvoltage condition and damage components supplied by the SIMO power supply. To prevent the high inrush current at start-up of the SIMO power supply, various soft start circuits are used that require additional components to limit the inrush current, protect against overcurrent in the inductor, and overvoltage on the outputs. The additional components add complexity, higher costs, and larger area of an integrated circuit implementation of the PWM switch mode power supply.

Therefore, a need exists for a soft start technique of a PWM switch mode power supply that does not require additional components.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 3:
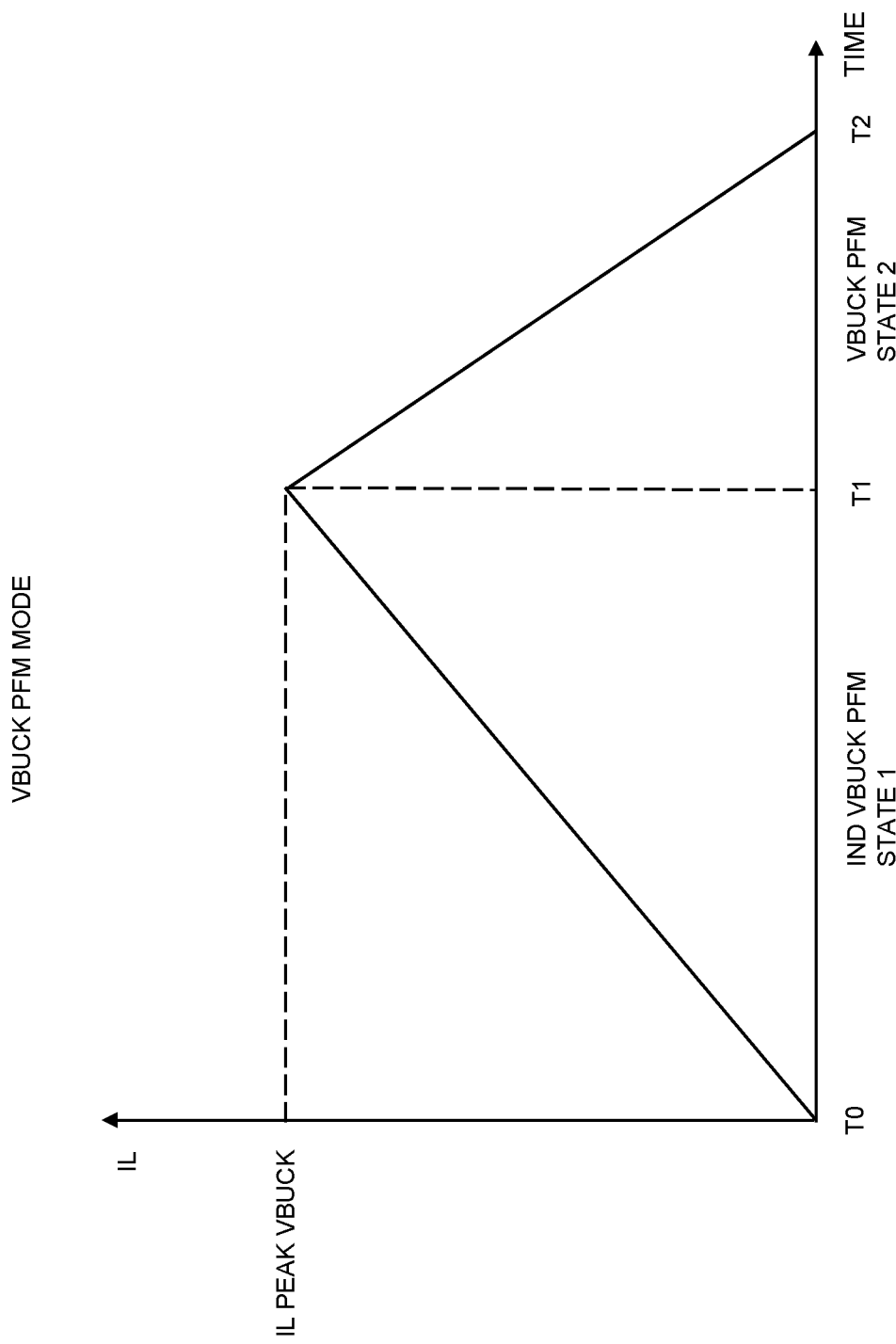
FIG. 3 illustrates a waveform of a VBUCK PFM mode of the SIMO power stages of FIG. 2.
Figure 4:
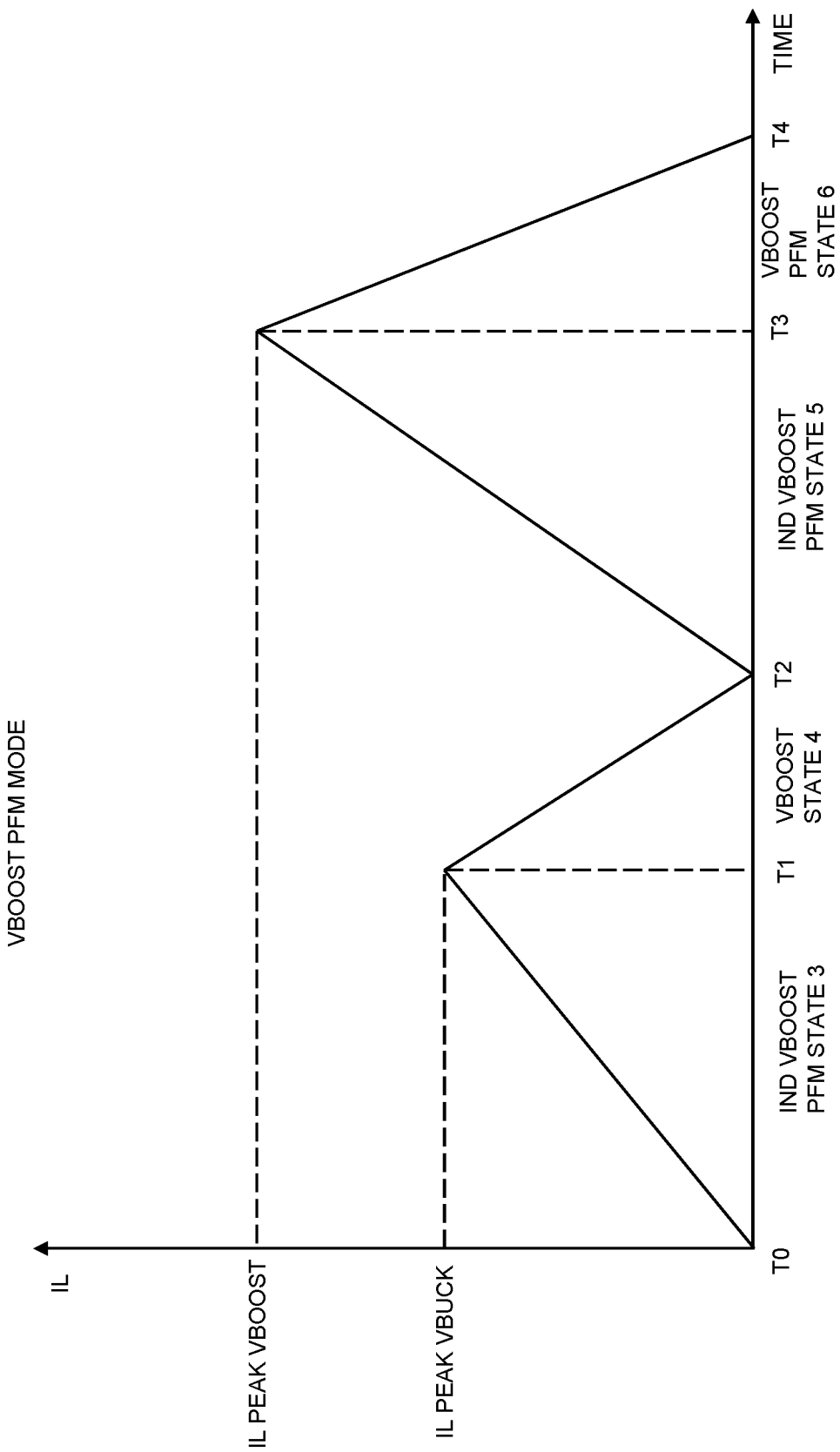
FIG. 4 illustrates a waveform of a VBOOST PFM mode of the SIMO power stages of FIG. 2.

Generally, there is provided, a method for soft starting a single inductor multiple output (SIMO) power supply for operation in PWM mode. The SIMO can operate in both a pulse frequency modulation (PFM) mode and a PWM mode. The PFM mode is more efficient at light load current compared to PWM mode which is more efficient at high load current. In one embodiment, the power supply supplies two different DC output voltages, a buck output voltage and a boost output voltage. The input power supply may be powered using a battery. The buck output voltage is lower than the battery voltage and the boost output voltage is above the battery voltage. PFM operation may include two operating modes, a PFM mode called a VBUCK PFM mode and the other PFM mode called a VBOOST PFM mode. In one embodiment, the method for soft starting the SIMO power supply in PWM mode includes powering up the power supply in one of two the PFM modes, and then transitioning to PWM mode. In another embodiment, the power supply is powered up first in the VBUCK PFM mode, then transitioned to the VBOOST PFM mode, and finally moving to the PWM mode. VBUCK PFM mode is a single-charge, single-discharge inductor current power scheme as shown in FIG. 3. VBOOST PFM mode is a multiple-charge, multiple-discharge inductor current power scheme as shown in FIG. 4.

The start-up method for operating in PWM mode results in the current in the inductor ramping up more gradually and limiting the inrush current, thus reducing the likelihood of an overcurrent, overvoltage, or overstress condition in both regulated outputs of the power stages of the SIMO power supply. Also, start-up in PFM mode does not require the use of a clock signal or an error amplifier like that required for PWM mode. Also, starting in PFM mode reduces a potential instability issue. In addition, power efficiency is optimized during start-up in PFM mode at relatively light load to move the states progressively to PWM mode for operation at maximum output power.

In one embodiment, there is provided, a method for soft starting a single inductor multiple output (SIMO) power supply, the method including: selecting a pulse width modulation (PWM) mode; enabling a first pulse frequency modulation (PFM) mode in the SIMO power supply; supplying a first load with a first voltage while in the first PFM mode; disabling the first PFM mode; enabling the PWM mode in the SIMO power supply; and operating the SIMO power supply in the PWM mode. This embodiment represents a solution to the problem of how to facilitate realizing a soft start technique of a PWM switch mode power supply that does not require additional components. The method may further include controlling the SIMO power supply using a finite state machine. Operating the SIMO power supply in the PWM mode may further include: after disabling the first PFM mode and prior to operating the SIMO power supply in the PWM mode, selecting a second PFM mode; and supplying the first load with the first voltage and a second load with a second voltage while in the second PFM mode. The method may further include concurrently supplying the first load with the first voltage and the second load with the second voltage in the first PFM mode further includes charging the single inductor through the first and second loads. Supplying the first load with the first voltage and a second load with a second voltage in the second PFM mode may further include: charging the single inductor in the second PFM mode; discharging the single inductor through the first load in the second PFM mode; recharging the single inductor in the second PFM mode; and discharging the single inductor in the second PFM mode though a second load. The second voltage may be higher than the first voltage. The second voltage may be higher than a supply voltage provided to the SIMO power supply and the first voltage is lower than the supply voltage. The method may further include providing the supply voltage from a battery. Operating the SIMO power supply in the PWM mode may further include providing a clock in PWM mode.

In another embodiment, there is provided, a method for soft starting a single inductor multiple output (SIMO) power supply, the method including: selecting a pulse width modulation (PWM) mode; charging the single inductor in a first pulse frequency modulation (PFM) mode; discharging the single inductor through a first load in the first PFM mode; recharging the single inductor in the first PFM mode; discharging the single inductor in the first PFM mode through a second load; disabling the first PFM mode; enabling the PWM mode after disabling the first PFM mode; and operating the SIMO power supply in the PWM mode. This embodiment represents an alternative solution to the problem of how to facilitate realizing a soft start technique of a PWM switch mode power supply that does not require additional components. The method may further include controlling the SIMO power supply using a finite state machine. Operating the SIMO power supply in the PWM mode may further include: charging the single inductor to a first voltage in the PWM mode; and sequentially discharging the single inductor from the first voltage to a second voltage through the first load and then through the second load. The method may further include enabling a second PFM mode before selecting the first PFM mode during soft start of the SIMO power supply, wherein the second PFM mode includes: charging the single inductor through the first and second loads at the same time; and discharging the single inductor through the first and second loads at the same time. The method may further include providing a supply voltage to the SIMO power supply from a battery. Operating the SIMO power supply in the PWM mode may further include providing a clock in PWM mode. The steps of charging the single inductor in the first PFM mode and discharging the single inductor through the first load in the first PFM mode may further include repeating the steps of charging and discharging until a first voltage is reached.

In yet another embodiment, there is provided, a method for soft starting a single inductor multiple output (SIMO) power supply, the method comprising: selecting a pulse width modulation (PWM) mode; enabling a first pulse frequency modulation (PFM) mode in the SIMO power supply; charging a single inductor of the SIMO power supply through first and second loads at the same time while in the first PFM mode; discharging the single inductor through the first and second loads at the same time while in the first PFM mode; enabling a second PFM mode in the SIMO power supply after disabling the first PFM mode; charging the single inductor in the second PFM mode; discharging the single inductor through the first load in the second PFM mode; charging the single inductor in the second PFM mode; discharging the single inductor in the first PFM mode though the second load; enabling the PWM mode after disabling the second PFM mode; and operating the SIMO power supply in the PWM mode. The steps of charging and discharging in the first PFM mode may further include repeating the steps until a first voltage is reached. Enabling the first pulse frequency modulation (PFM) mode in the SIMO power supply may further include: charging a single inductor of the SIMO power supply through first and second loads at the same time while in the first PFM mode; and discharging the single inductor through the first and second loads at the same time while in the first PFM mode. Enabling the second PFM mode in the SIMO power supply after disabling the first PFM mode may further include: charging the single inductor in the second PFM mode; discharging the single inductor through the first load in the second PFM mode; charging the single inductor in the second PFM mode; and discharging the single inductor in the first PFM mode though the second load.

Figure 1:
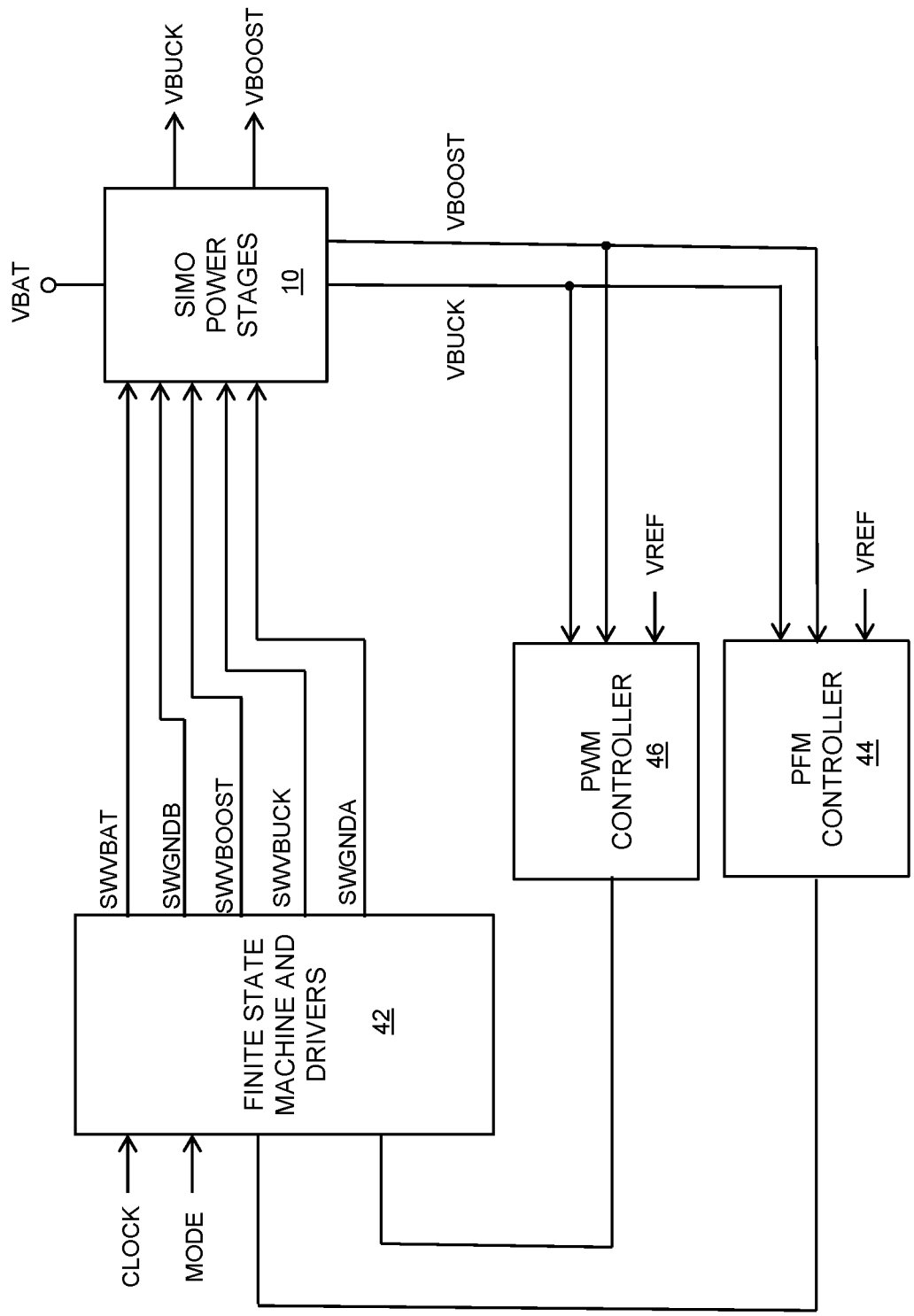
FIG. 1 illustrates a SIMO switch mode power supply in accordance with an embodiment.

FIG. 1 illustrates a simplified view of a SIMO switch mode power supply 40 in accordance with an embodiment. A switch mode power supply supplies power using switches for switching current on and off to charge and discharge storage components such as inductors and capacitors. A supply voltage can be AC or DC to provide a regulated DC output voltage. A battery may be used to provide the supply voltage. In one embodiment, the SIMO power supply 40 includes SIMO power stages 10, finite state machine (FSM) and drivers 42, PFM controller 44, and PWM controller 46. Power stages 10 supply two output voltages labeled VBUCK and VBOOST from a battery power supply voltage labeled VBAT. Another embodiment may provide more than two regulated output voltages.

Regulated output voltages VBUCK and VBOOST are provided at different voltage levels. In one embodiment, output voltage VBUCK is a buck voltage and is lower than battery voltage VBAT, while output voltage VBOOST is boosted above battery voltage VBAT. In another embodiment, the output voltages may be different. Also, in another embodiment, the power supply voltage may be provided from a different source. In the illustrate embodiment, power supply 40 functions as a DC-to-DC converter. Power stages 10 is controlled by FSM and drivers 42 that receives feedback signals through a feedback path including PFM controller 44 and PWM controller 46. PFM controller 44 operates when power supply 40 operates in PFM mode, and PWM controller 46 operates when power supply 40 is in PWM mode.

Figure 2:
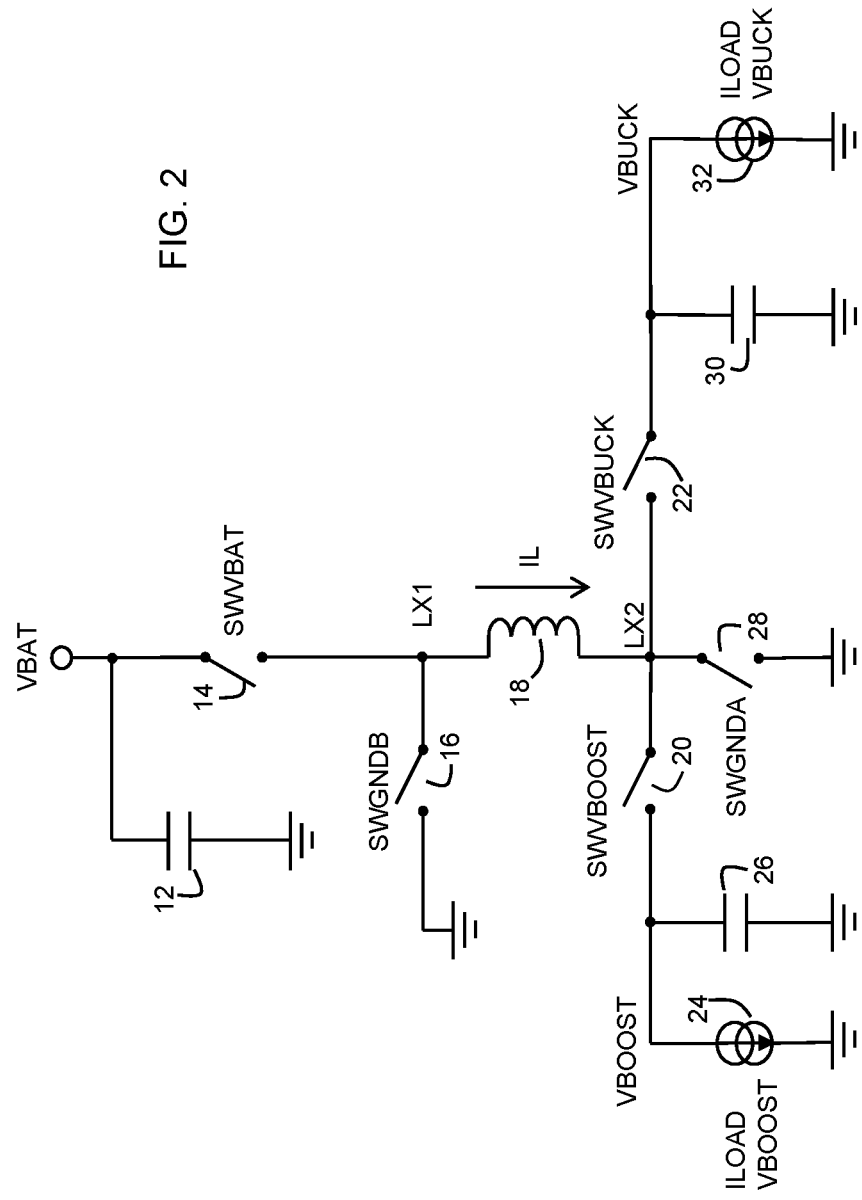
FIG. 2 illustrates the power stages of FIG. 1 in accordance with an embodiment.

Finite state machine and drivers 42 includes various circuits and functions to control the assertion of switch control signals SWVBAT, SWGNDB, SWVBOOST, SWVBUCK, and SWGNDA to power stages 10 for both the PFM modes and the PWM mode. For example, FSM and drivers 42 may include drivers for conditioning the switch control signals. Also, FSM and drivers 42 may include timing circuits for timing the operation of the PFM modes. The FSM may be implemented in hardware, software, or a combination of hardware and software. FSM and drivers 42 have an input signal for receiving a clock signal labeled CLOCK. The clock signal may be used to generate a PWM clock signal for timing the switches in PWM mode. FSM and drivers 42 has a mode input labeled MODE for controlling whether power supply 40 operates in VBUCK PFM mode, VBOOST PFM mode or PWM mode. FIG. 2 shows power stages 10 in more detail and will be discussed later. PFM controller 44 is in the feedback path from the outputs of power stages 10 to FSM and drivers 42 and includes timers, and comparators to control the voltage levels of voltages VBUCK and VBOOST during operation in one of the two PFM modes. Likewise, PWM controller 46 is in the feedback path from the outputs of power stages 10 to FSM and drivers 42 and includes comparators to control the voltage levels of VBUCK and VBOOST during operation in PWM mode.

FIG. 2 illustrates power stages 10 of FIG. 1 in accordance with an embodiment. Power stages 10 includes inductor 18, switches 14, 16, 20, 22, and 28, capacitors 12, 26, and 30. All of switches 14, 16, 20, 22, and 28 are illustrated in an open position in FIG. 2 corresponding to an initial OFF state. Capacitor 12 has a first terminal connected to power supply terminal labeled VBAT, and a second terminal connected to a ground terminal. Switch 14 has a first terminal connected to VBAT, a second terminal connected to a node labeled LX1, and is controlled by switch control signal SWVBAT. Inductor 18 has a first terminal connected to the second terminal of switch 14, and a second terminal at a node LX2. Switch 16 has a first terminal connected to the first terminal of inductor 18 at node LX1, a second terminal connected to ground, and is controlled by switch control signal SWGNDB. Switch 28 has a first terminal connected to the second terminal of inductor 18 at node LX2, a second terminal connected to ground, and is controlled by switch control signal SWGNDA. Switch 20 has a first terminal connected to node LX2, a second terminal for providing output voltage VBOOST, and switch 20 is controlled by switch control signal SWVBOOST. Capacitor 26 has a first terminal connected to the second terminal of switch 20, and a second terminal connected to ground. A load 24 is connected to receive output voltage VBOOST. Load 24 sinks a current labeled ILOAD VBOOST to ground. Switch 22 has a first terminal connected to node LX2, a second terminal for providing output voltage VBUCK, and switch 22 is controlled by switch control signal SWVBUCK. Capacitor 30 has a first terminal connected to the second terminal of switch 22, and a second terminal connected to ground. A load 32 is connected to receive output voltage VBUCK. Load 32 sinks a current labeled ILOAD VBUCK to ground.

Power stages 10 operates as a switch mode power supply power stage that can provide two different DC output voltages. Specifically, in the illustrated embodiment, power stages 10 is shown for use in a portable device and is powered with a battery for providing supply voltage VBAT. Using feedback, FSM and drivers 42 controls the timing and operation of switches 14, 16, 20, 22, and 28 to charge and discharge inductor 18, capacitors 12, 28, and 30, and output loads 24 and 32 at a controlled rate to provide two regulated DC output voltage VBUCK and VBOOST. DC voltage VBUCK is a buck voltage regulated to be less than battery voltage VBAT and DC voltage VBOOST is a regulated voltage boosted above battery voltage VBAT. Power stages 10 can be controlled using a PFM switching mode to supply a low load current at relatively higher efficiency or use a PWM switching mode to supply a high load current at relatively high efficiency. Other embodiments may provide more than two output voltages.

Figure 5:
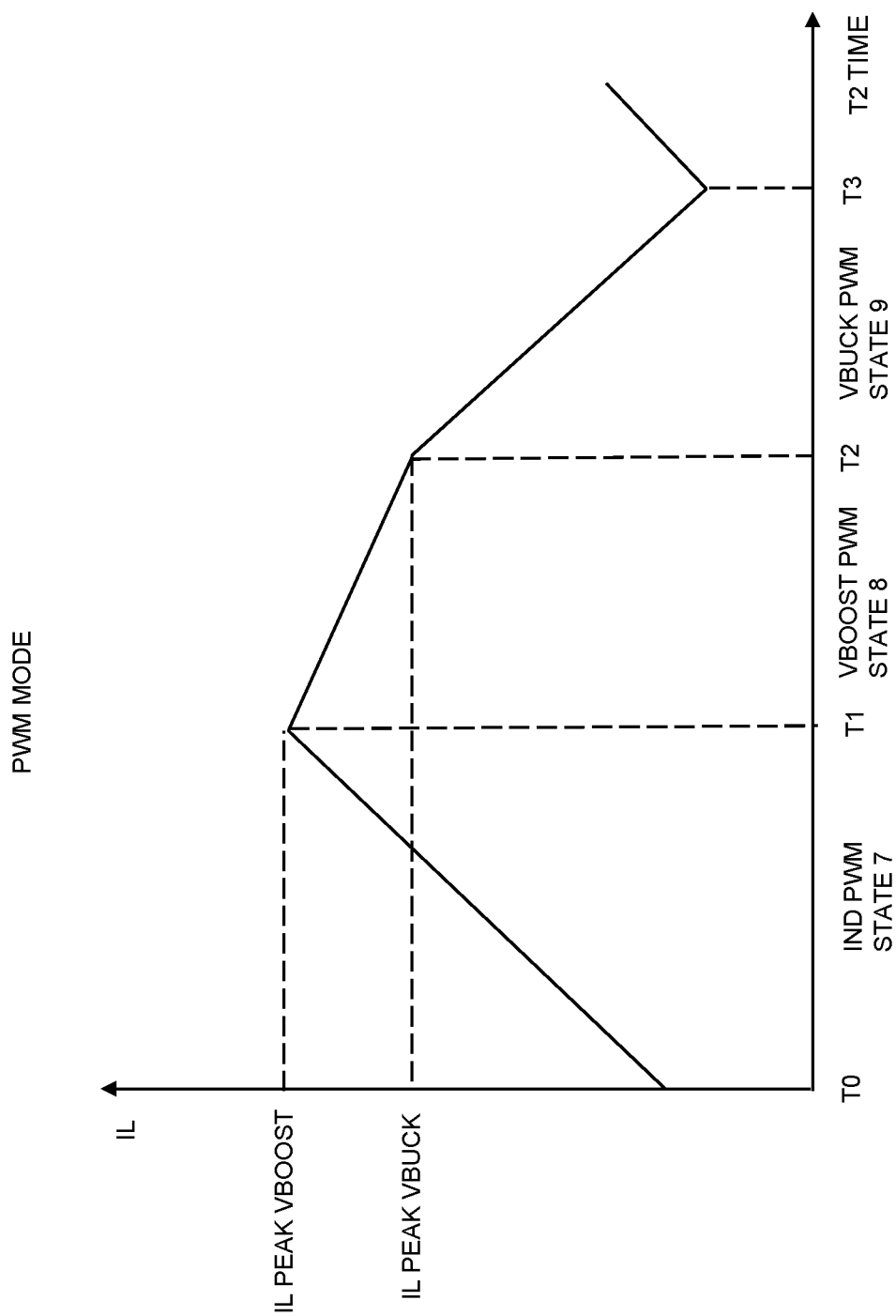
FIG. 5 illustrates a waveform of a PWM mode of the SIMO power stages of FIG. 2.

Starting up power stages 10 in PWM mode can produce a large inrush current that may produce an overcurrent condition in power stages 10. In accordance with an embodiment, an inrush current is limited by soft starting up power stages 10 in one or both of the two PFM modes before transitioning to PWM mode. That is, the soft start procedure first enables the VBUCK PFM mode until the VBUCK PFM mode ramps up, then VBOOST PFM mode is enabled, followed by the PWM mode. FIG. 3 illustrates a waveform of a VBUCK PFM mode of power stages 10 of FIG. 2. VBUCK PFM mode is a single-charge single-discharge mode that supplies one output with voltage VBUCK. FIG. 4 illustrates a waveform of a VBOOST PFM mode of the SIMO power stages of FIG. 2. VBOOST PFM mode is a multiple-charge multiple-discharge mode that supplies two outputs, one with voltage VBUCK and the other with voltage VBOOST. FIG. 5 illustrates a waveform of a PWM mode of the SIMO power stages of FIG. 2. PWM mode is a single-charge successive-discharge mode that provides a maximum output power for both outputs VBUCK and VBOOST.

By using the soft start-up sequence for enabling PWM mode allows the current through inductor 18 to ramp up more slowly, thus reducing a start-up current in power stages 10. In another embodiment, one of VBUCK PFM mode or VBOOST PFM mode is not used for soft starting power stages 10. For example, VBUCK PFM mode may not be used in the soft start sequence so that the soft start sequence only includes VBOOST PFM mode followed by the PWM mode. Likewise, the soft start sequence may include only the VBUCK PFM mode followed by PWM mode. When all the switches of power stage 10 are open as illustrated in FIG. 2, then power stage 10 may be in an "off" state. In the illustrated embodiments, a closed switch is a switch that has a short circuit between the switch terminals, and an open switch is a switch that has an open circuit between the switch terminals.

Figure 6:
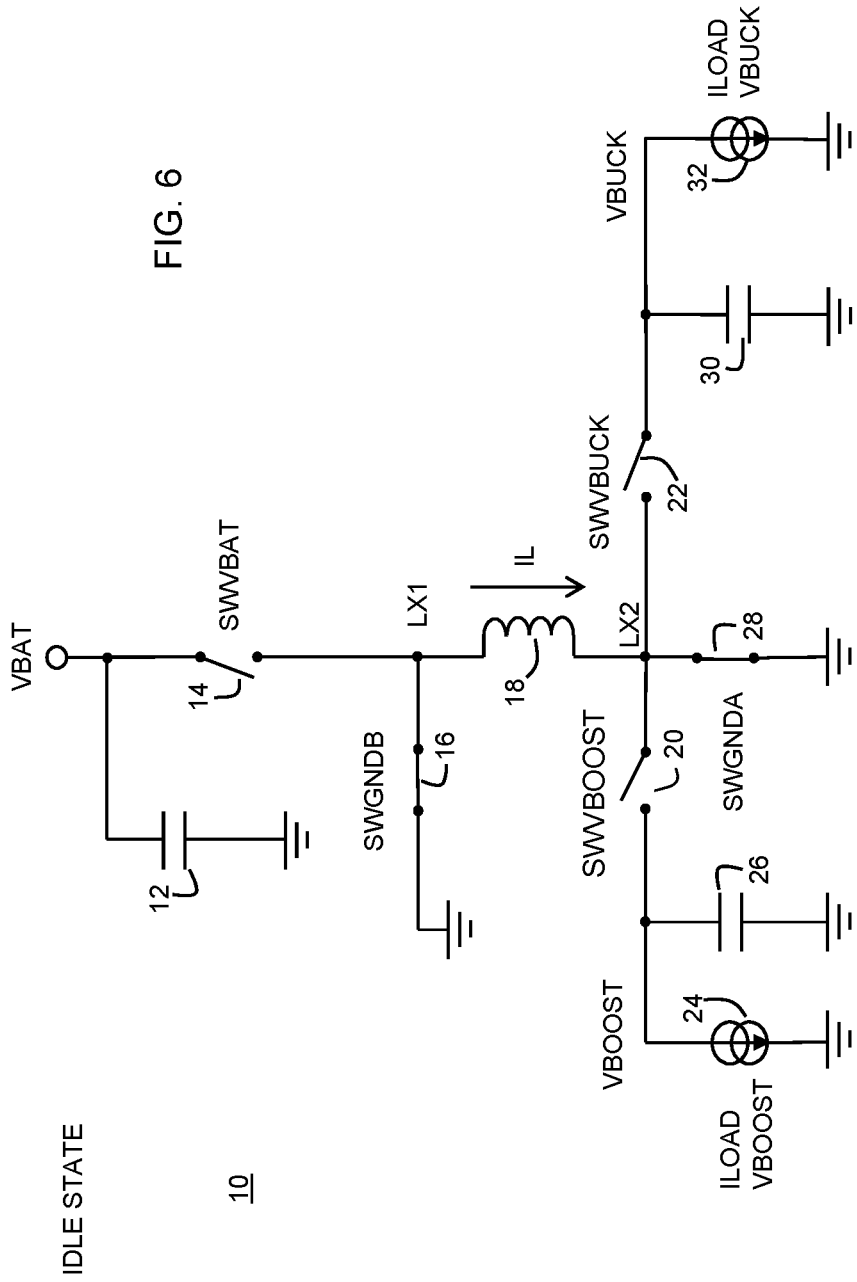
FIG. 6 illustrates switch positions of an idle state of the power stages of FIG. 2 in accordance with an embodiment.

FIG. 6 illustrates the switch positions for an IDLE state of power stages 10. In the IDLE state, switch 16 is closed, connecting node LX1 to ground and switch 28 is closed connecting node LX2 to ground. Switches 14, 20, and 22 are open. In one embodiment, the method for soft starting power stages 10 may begin from the IDLE. In another embodiment, the method for soft starting power stages 10 begins from the OFF state illustrated in FIG. 2.

Figure 7:
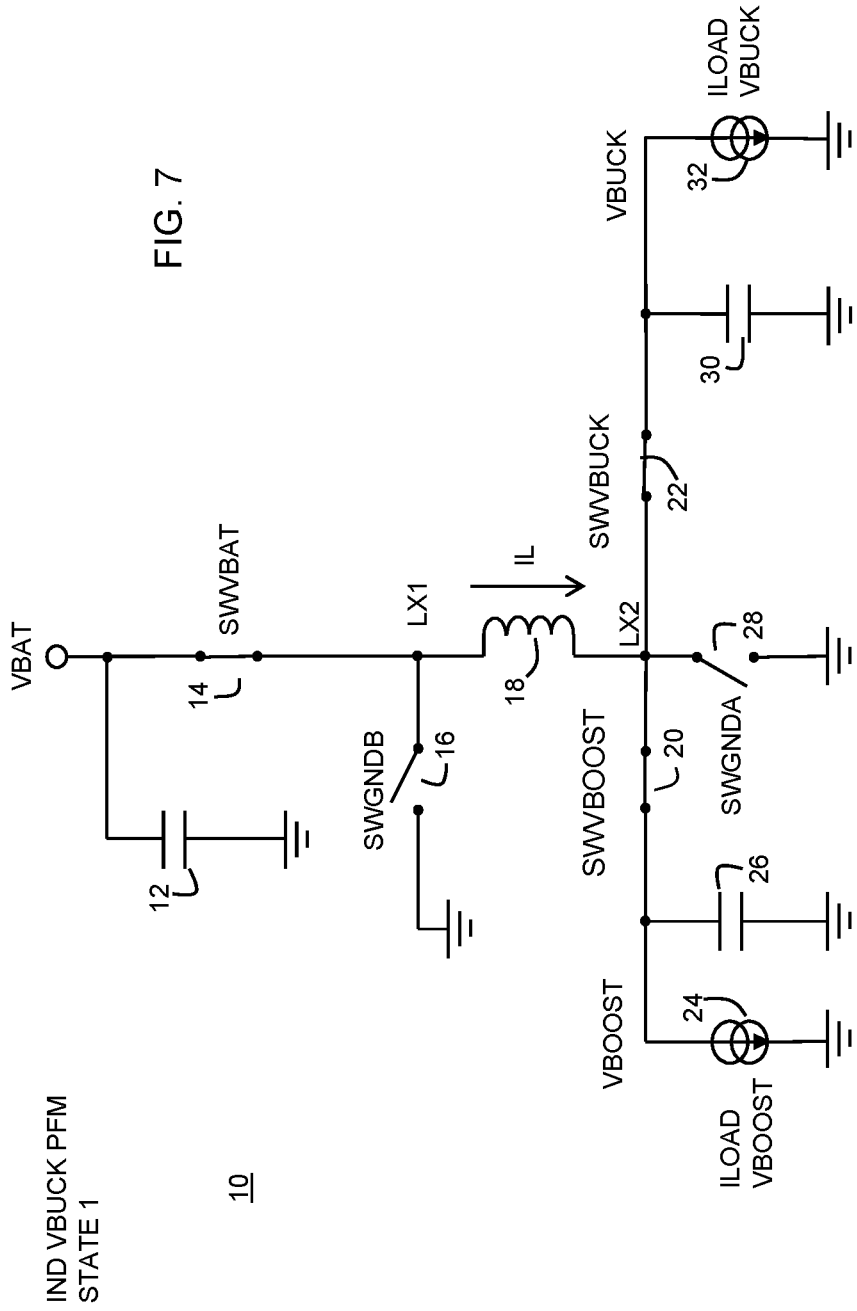
FIGS. 7-15 illustrate phases, or states, of a soft start sequence of the power stages of FIG. 2 in accordance with an embodiment.

FIGS. 7-15 illustrate a sequence of switch positions for the phases, or states, of a soft start method of power stages 10 of FIG. 2 in accordance with one embodiment. When the PWM mode is selected to be enabled, the soft start sequence of states goes from an off state of power supply 40 in PWM mode through the sequences illustrated in FIGS. 6-14. In another embodiment, the soft start sequence may begin with an IDLE state instead of the OFF state. An IDLE state may have grounding switches SWGNDA and SWGNDB closed while the other switches are open (IDLE state not shown). The states are numbered in a sequence from 1 to 9. FIGS. 6 and 7 illustrate the switch positions and sequence of states 1 and 2 for operation in VBUCK PFM mode. FIG. 7 illustrates switch positions for a first state labeled IND VBUCK PFM STATE 1. Note that generally, state names that begin with "IND" indicate states for charging inductor 18. As illustrated in FIG. 7, switches 14, 20, and 22 are closed and switches 16 and 28 are open to charge inductor 18 through both loads 24 and 32. A voltage at node LX1 is increased to VBAT while node LX2 is at VBUCK potential (node LX2 is initially at ground). FIG. 3 illustrates inductor 18 current IL rising from time T0 to time T1 in IND VBUCK PFM STATE 1.

Figure 8:
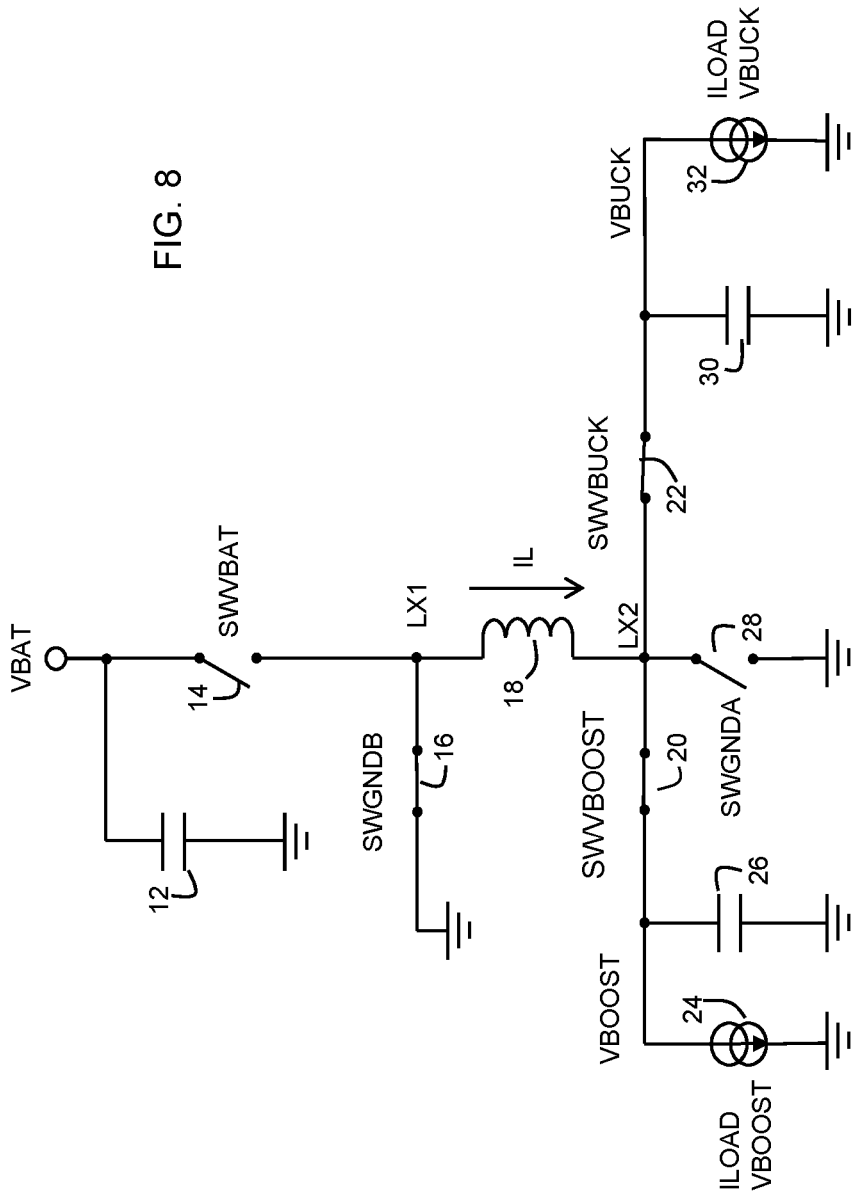

FIG. 8 illustrates switch positions for a second state labeled VBUCK PFM STATE 2. In FIG. 8, switches 16, 20, and 22 are closed and switches 14 and 28 are open. As can be seen in FIG. 3 from time T1 to time T2, inductor 18 current IL drops as the charge on inductor 18 is discharged through load 24 ILOAD VBOOST and load 32 ILOAD VBUCK. The voltage on node LX1 drops from VBAT to ground and the voltage of node LX2 rises from ground to voltage VBUCK. During a normal operation of VBUCK PFM mode, the switch positions of states 1 and 2 are repeated to provide a regulated output voltage VBUCK. In addition, because switch 20 is closed, the voltages VBOOST and VBUCK are equalized. The first state of FIG. 7 and the second state of FIG. 8 may be repeated to provide DC voltage VBUCK at the VBUCK output of power stage 10.

Figure 9:
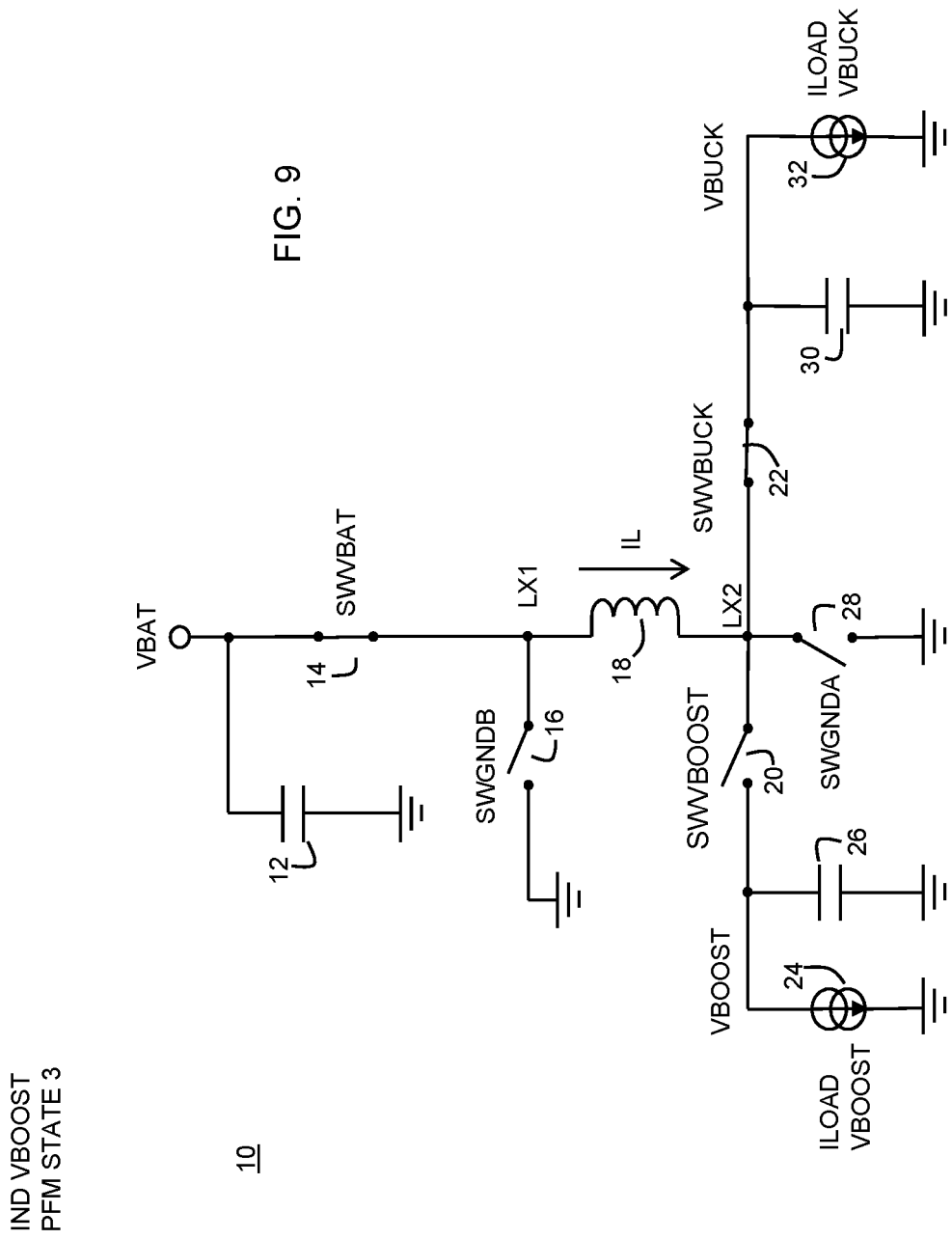

FIGS. 9-12 illustrate a sequence of switch positions for operation in VBOOST PFM mode. The VBOOST PFM mode is for providing a multiple-charge, multiple discharge of inductor 18, and provides both voltage VBUCK and VBOOST at the outputs VBUCK and VBOOST of power stage 10. As mentioned above, VBOOST PFM mode follows VBUCK PFM mode in one embodiment of the soft start sequence for enabling operation in PWM mode. Alternately, a soft start method may begin with VBOOST PFM mode instead of VBUCK PFM mode, where VBUCK PFM mode is not used for start-up. In the illustrated soft start sequence, FIG. 9 illustrates switch positions for a third state labeled IND VBOOST PFM STATE 3. In FIG. 9, switches 14 and 22 are closed while switches 16, 20, and 28 are open to charge inductor 18 through load 32 ILOAD VBUCK. FIG. 4 illustrates inductor 18 current increasing for the IND VBOOST PFM STATE 3 between times T0 and T1. Node LX1 is at voltage VBAT while node LX2 is at ground potential.

Figure 10:
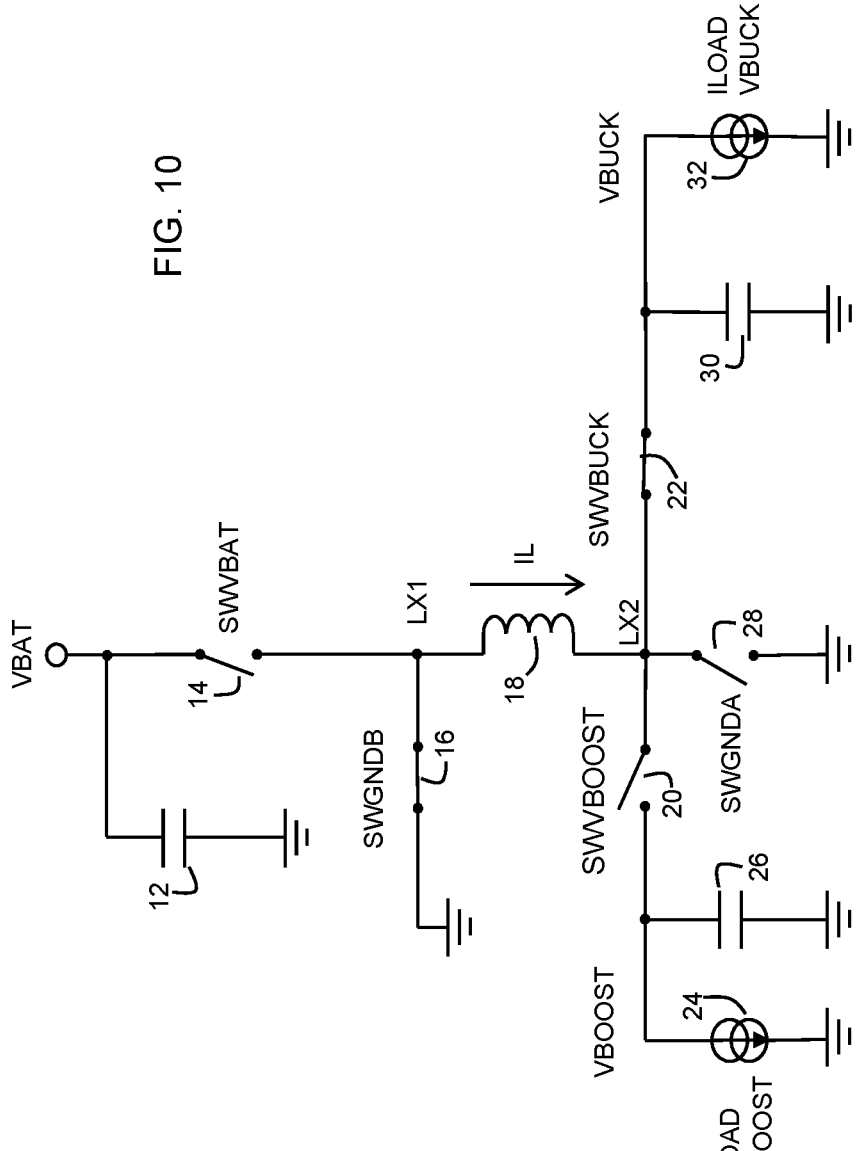

FIG. 10 illustrates switch positions for a fourth state labeled VBOOST PFM STATE 4. In FIG. 10, switches 16 and 22 are closed while switches 14, 20, and 28 are open to discharge inductor 18 through VBUCK load 32. FIG. 4 illustrates inductor current IL decreasing from times T1 to T2 from a maximum current at time T1. Node LX1 is reduced to ground by the closed switch 16 and node LX2 is at voltage VBUCK.

Figure 11:
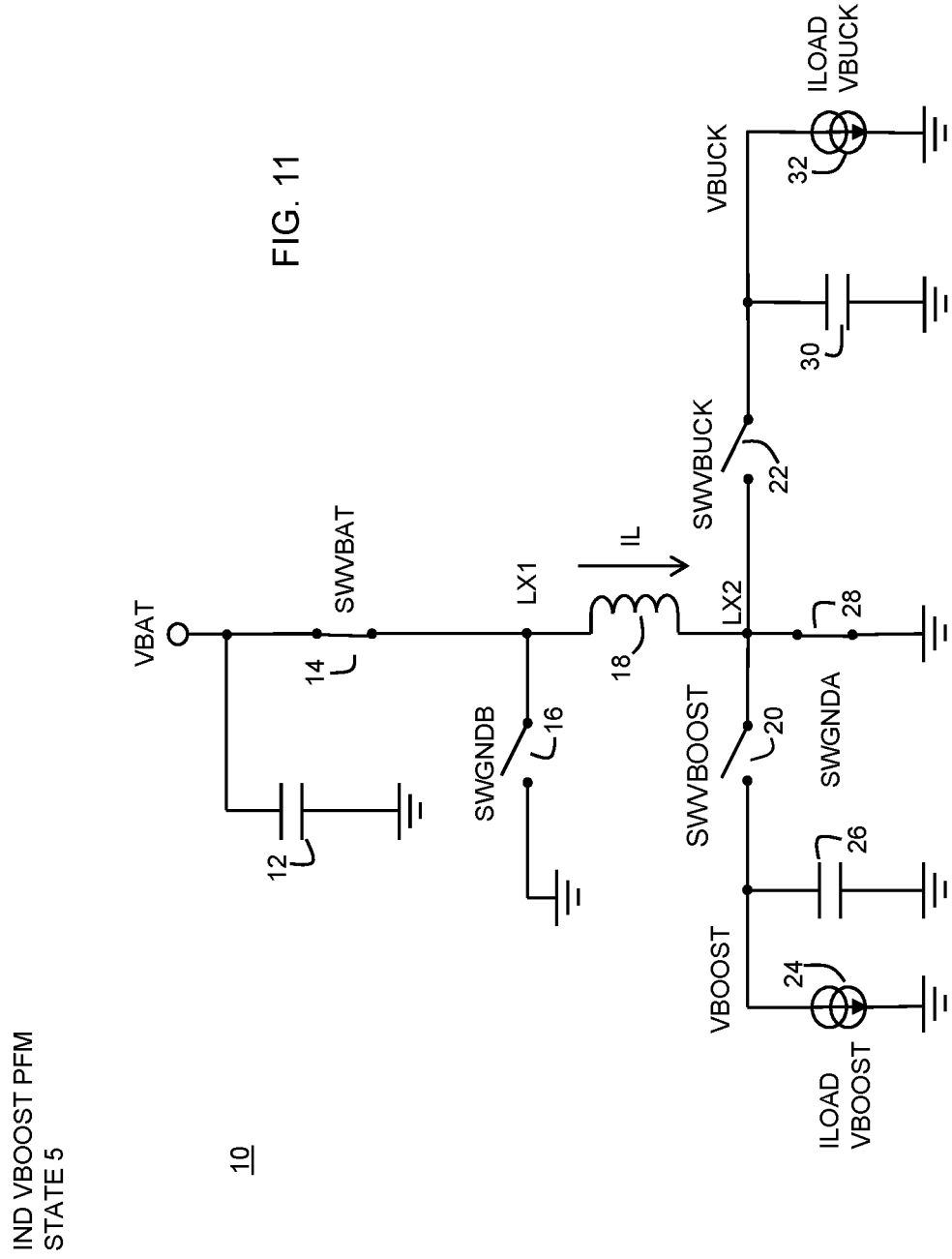

FIG. 11 illustrates switch positions for a fifth state of the soft start method labeled IND VBOOST PFM STATE 5. In FIG. 11, switches 14 and 28 are closed and switches 16, 20, and 22 are open to recharge inductor 18. The switch positions cause the voltage at node LX1 to be at voltage VBAT and node LX 2 to be at ground potential. The charging current through inductor 18 is incrementally higher than the charging current in the previous starting state. FIG. 4 illustrates that current IL increases from time T2 to time T3.

Figure 12:
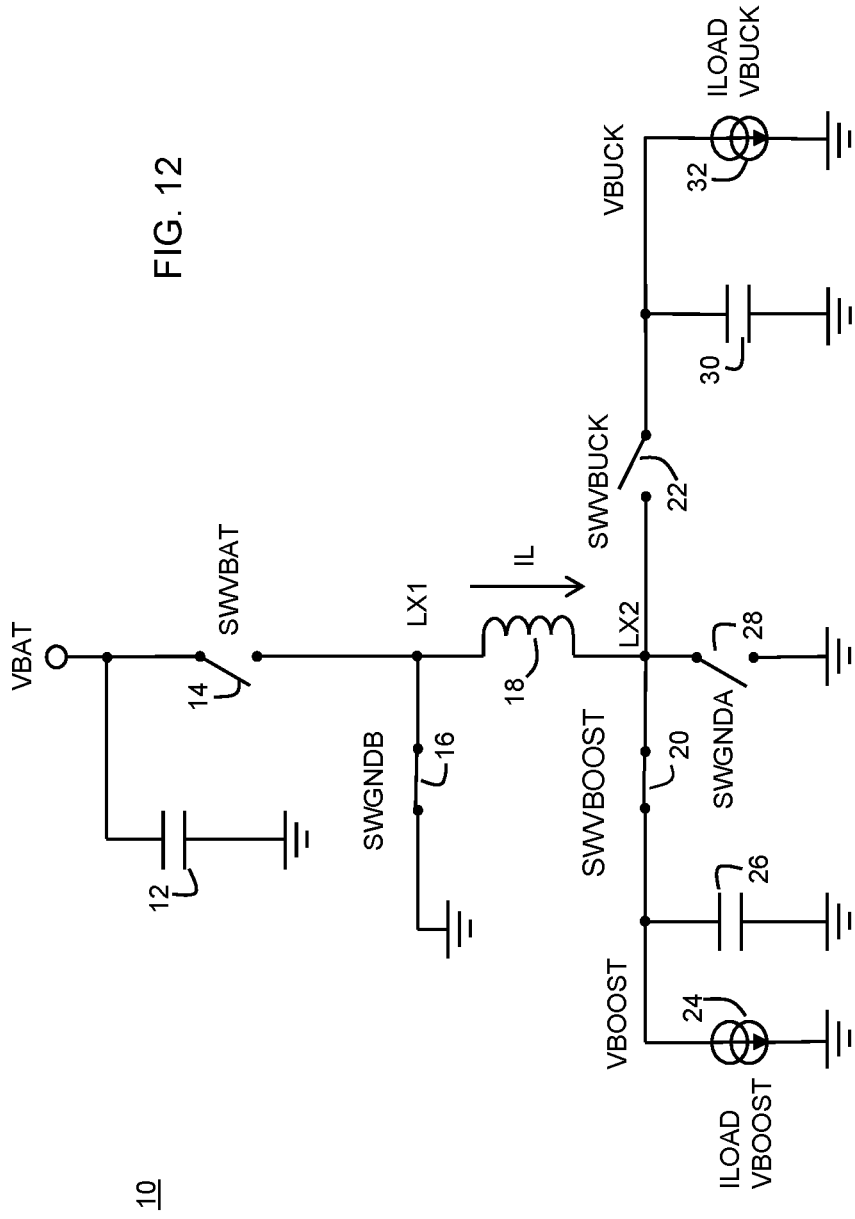

FIG. 12 illustrates switch positions for a sixth state of the soft start method labeled VBOOST PFM STATE 6. In FIG. 12, switches 16 and 20 are closed and switches 14, 22, and 28 are open. The switch positions cause node LX1 to be reduced to ground and node LX2 to be at voltage VBOOST to discharge inductor 18 through VBOOST load 24. Current IL is illustrated in FIG. 4 for the sixth state between times T3 and T4 as decreasing to zero. States 3 through 6 are repeated in sequence while in VBOOST PFM mode to provide both regulated voltages VBOOST and VBUCK at the output terminals of power stages 10. The method proceeds to disabling the VBOOST PFM mode and enabling PWM mode.

Figure 13:
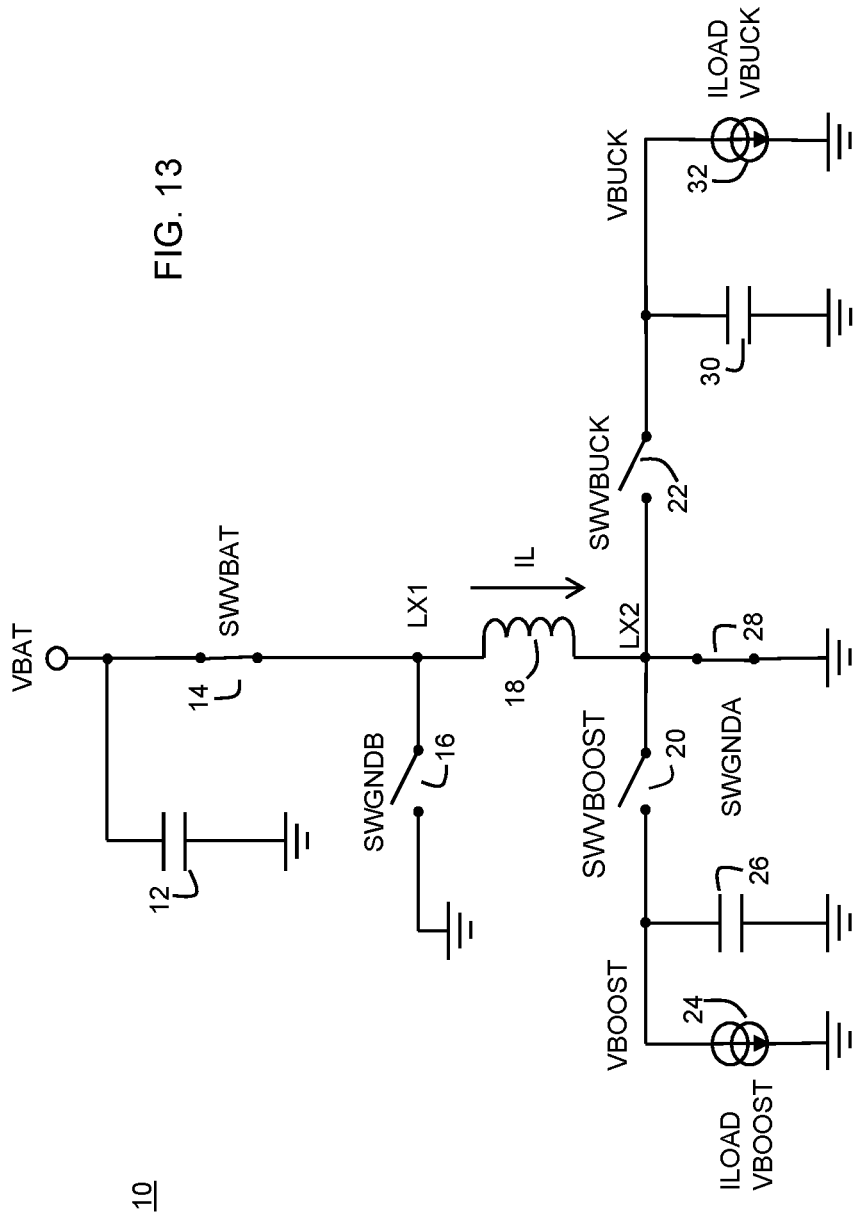
Figure 14:
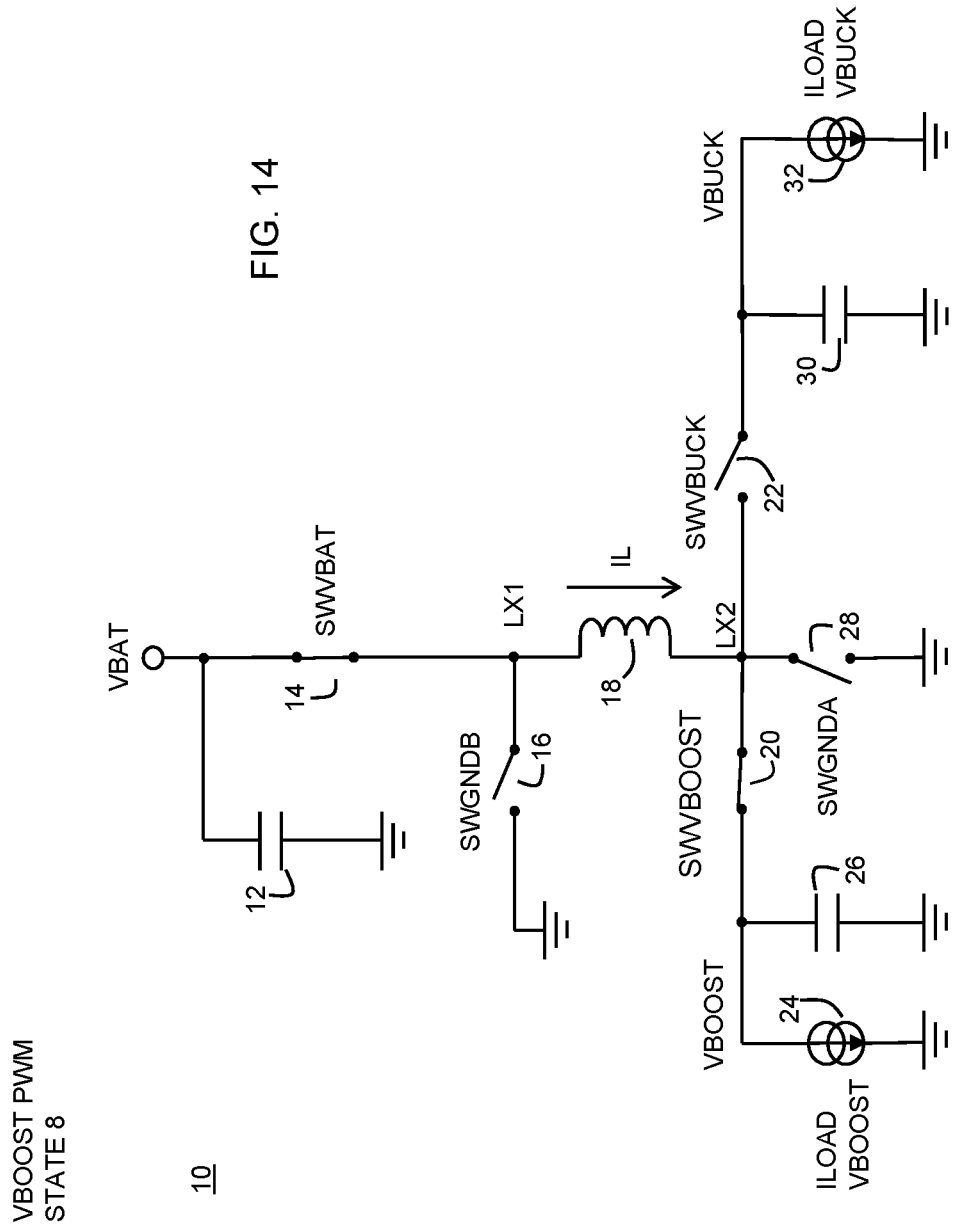
Figure 15:
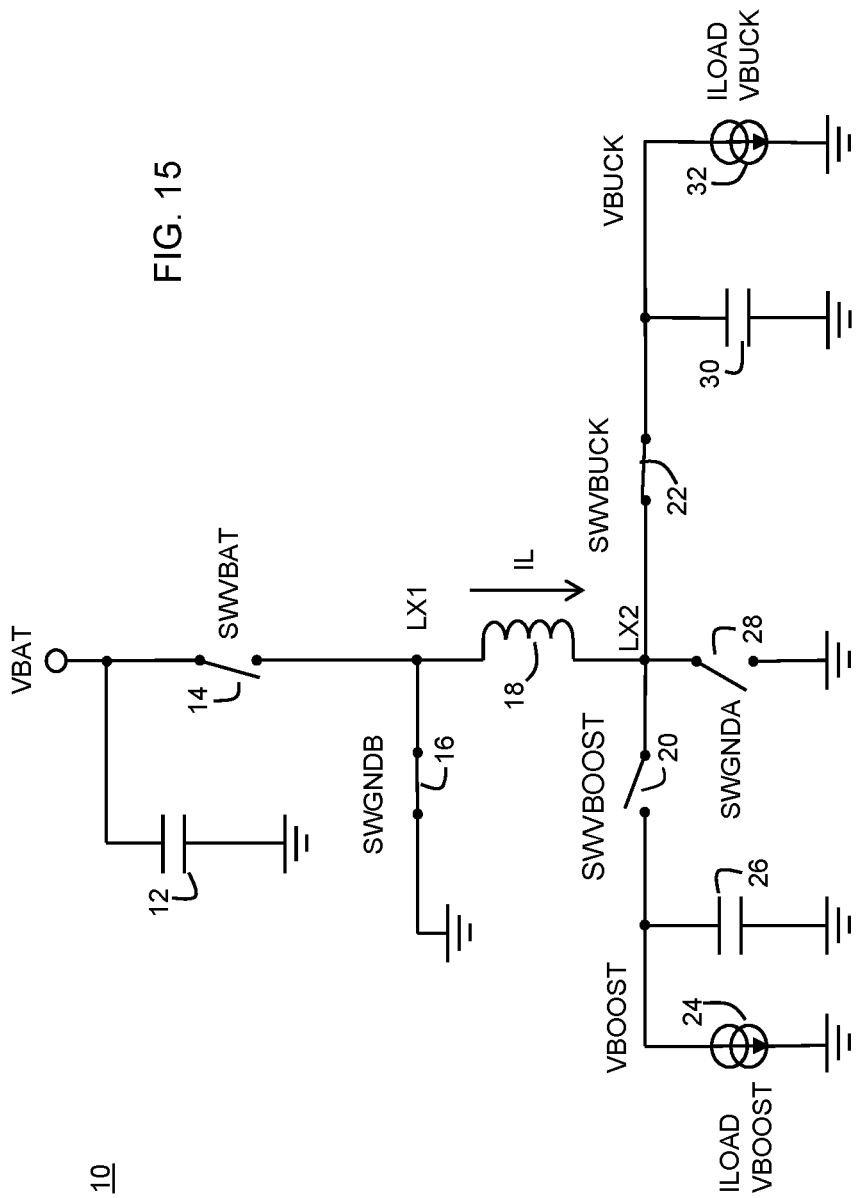

FIGS. 13, 14, and 15 illustrate the switch positions in a sequence for implementing PWM mode to provide multiple charging, successive discharging of inductor 18. The PWM mode provides regulated output voltages at outputs VBOOST and VBUCK. FIG. 13 illustrates switch positions for a seventh state labeled IND PWM STATE 7. In FIG. 13 switches 14 and 28 are closed and switches 16, 20, and 22 are open to charge inductor 18. The illustrated switch positions cause the voltage at node LX1 to be at voltage VBAT and the voltage at node LX2 to be at ground. Inductor current IL increases from zero at time T0 to a maximum current at time T1 as illustrated in FIG. 5. Note that during the initial cycle of PWM mode, the current at time T0 will start at zero. After the initial cycle, and for all subsequent cycles, the current will not fall all the way to zero as indicated at times T3 and T1 of FIG. 5.

FIG. 14 illustrates switch positions for an eighth state labeled VBOOST PWM STATE 8. In FIG. 14, switches 14 and 20 are closed and switches 16, 22, and 28 are open to begin a discharging inductor 18 to VBOOST load 24. The illustrated switch positions cause the voltage at node LX1 to be at voltage VBAT and node LX2 to be at voltage VBOOST. Inductor current IL is decreasing as illustrated in FIG. 5 between times T1 and T2.

FIG. 15 illustrates switch positions for a ninth state labeled VBUCK PWM STATE 9. In FIG. 15, switches 16 and 22 are closed and switches 14, 20, and 28 are open. The illustrated switch positions in FIG. 15 cause the voltage at node LX1 to be ground and the voltage at node LX2 to decrease from VBUCK to ground. Discharging of inductor 18 continues with this switch position until current IL reaches a minimum value. In FIG. 5, current IL drops between times T2 and T3 to the minimum current. States 7-9 repeat continuously while power stages 10 are in PWM mode. Note that the PWM states are timed by a clock signal labeled PWM CLOCK in FIGS. 17 and 18.

Alternately, the soft start method may use only VBUCK PFM mode or only VBOOST PFM mode to soft start power stages 10 before enabling PWM mode. For an embodiment that uses only VBOOST PFM mode to soft start power stages 10, the switch positions illustrated in FIGS. 7 and 8 are not used and the soft start method begins with the switch positions for VBOOST PFM mode starting at FIG. 9. In another embodiment having a power stage that is different than the illustrated power stage 10, a different switching scheme may be provided to cycle through the PFM and PWM modes for soft starting. Starting power stages 10 using the illustrated sequence of stages produces a lower initial inrush current, thus protecting power stages 10 from an overcurrent condition.

Figure 16:
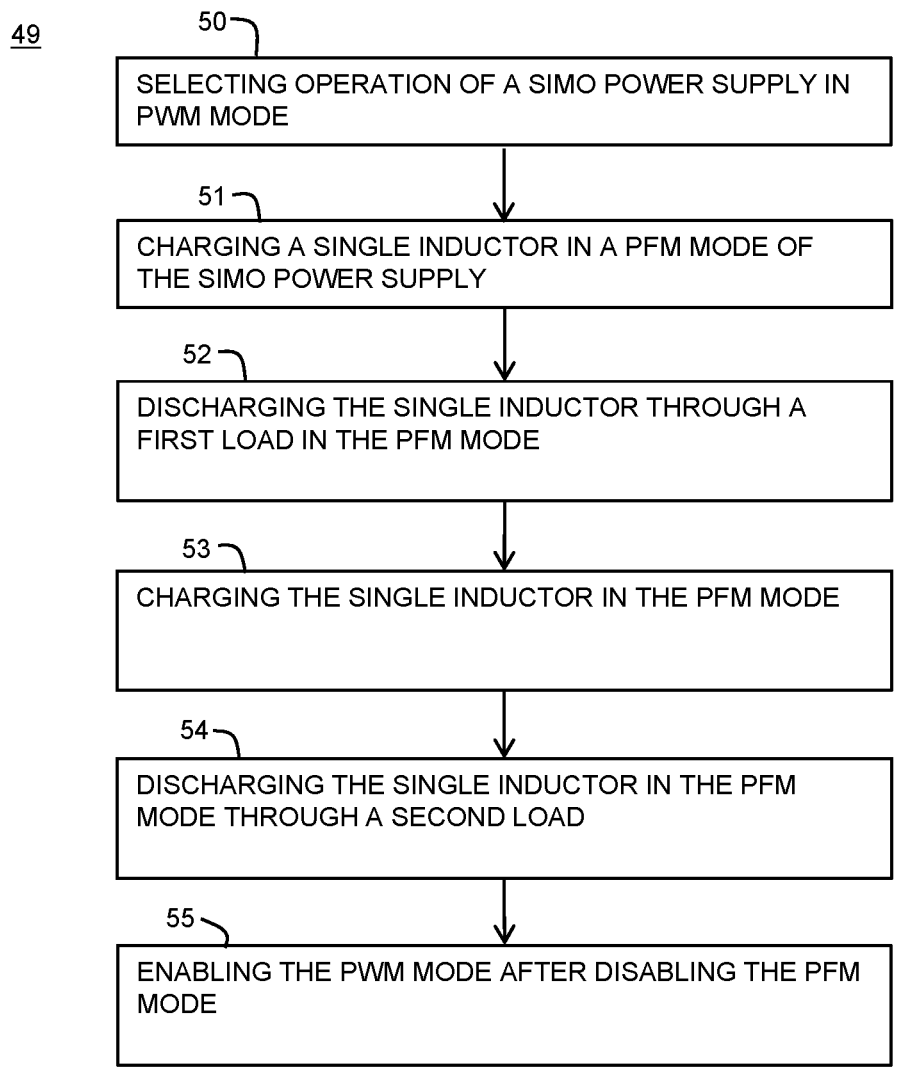
FIG. 16 is a flow chart of the method for accordance with an embodiment.

FIG. 16 is a flow chart of method 49 for soft starting a SIMO power supply in PWM mode in accordance with an embodiment. Method 49 begins at step 50 and will be discussed with reference to SIMO power stages 10 of FIG. 2. At step 50, the SIMO power supply is selected for operation in PWM mode. At step 51, a PFM mode is enabled in power stages 10 and inductor 18 is charged from voltage VBAT. The PFM mode may correspond to the VBOOST PFM mode shown in the flowchart of FIG. 4 and with the switch positions illustrated in FIGS. 9-12. Alternately, the PFM mode may be the VBUCK PFM mode illustrated in the flowchart of FIG. 3. At step 52, inductor 18 is discharged through a first load, for example, load 32 ILOAD VBUCK in the VBOOST PFM mode as illustrated in FIG. 9. At step 53, inductor 18 is recharged, for example, with the switch positions illustrated in FIG. 10. At step 54, inductor 18 is discharged to VBOOST via switches 16 and 20 from load 24 as illustrated in FIG. 12. Steps 51-54 are repeated until the output voltage, for example VBOOST, is at a predetermined voltage level. When the steps of the PFM mode are complete, at step 55, PWM mode is enabled after disabling the first PFM mode. Steps 51-54 may be repeated multiple times before PWM mode is enabled. A waveform illustrating PWM mode is provided in FIG. 5 and the sequence of switch positions is illustrated in FIGS. 13-15. In another embodiment, the soft start sequence may include both the VBUCK and VBOOST PFM modes as shown in FIG. 17.

Figure 17:
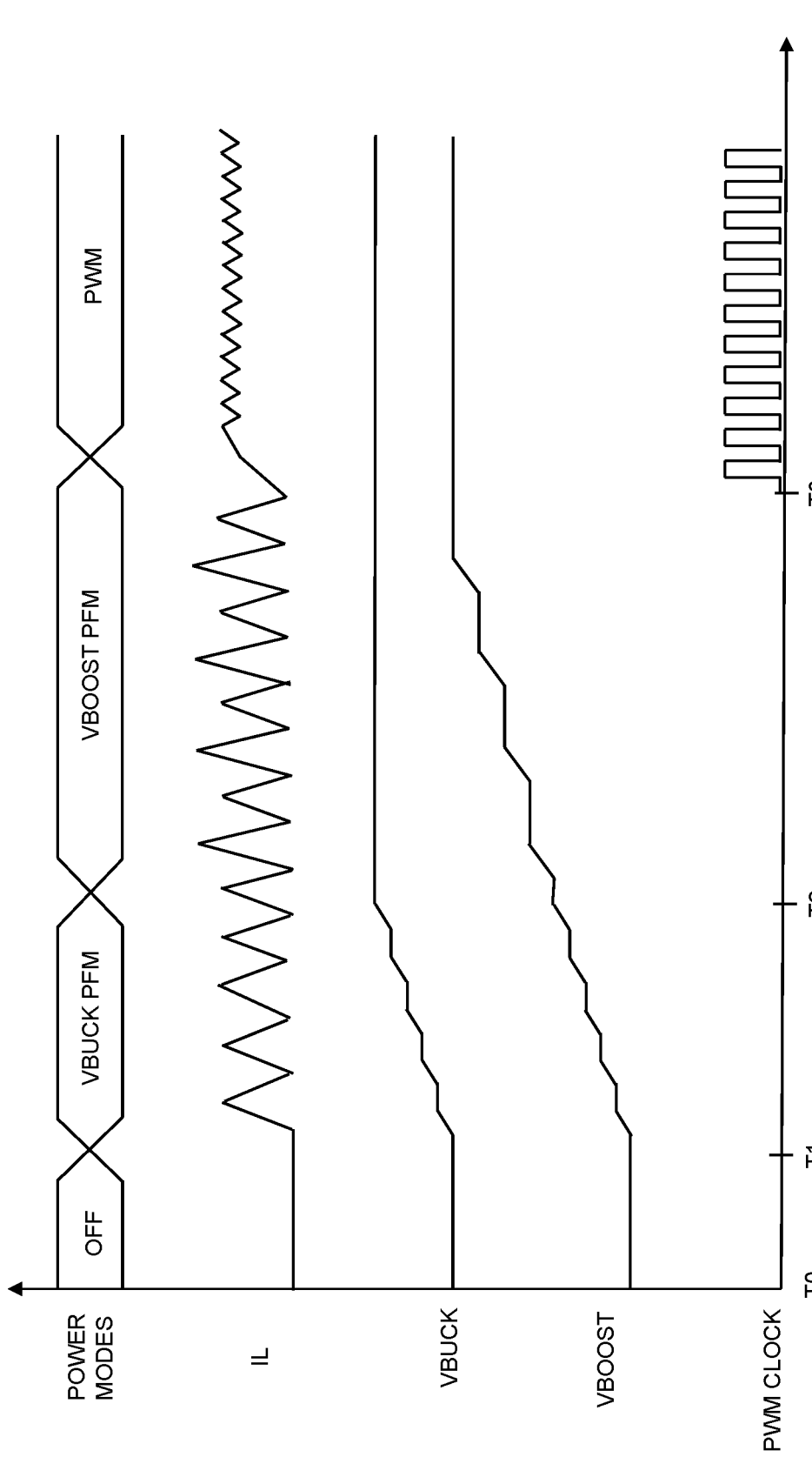
FIG. 17 illustrates waveforms of various signals useful for illustrating the soft starting method for operation in PWM mode in accordance with an embodiment.

FIG. 17 illustrates waveforms of various signals useful for illustrating the soft starting method for operation in PWM mode. In FIG. 17, the operating modes are labeled POWER MODES. Between times T0 and T1, power stages 10 are OFF. At time T1, VBUCK PFM mode starts. The states of VBUCK PFM mode may be repeated, if necessary, between time T1 and T2. The time interval between times T1 and T2 may be determined to allow the output voltage and current to stabilize and may be either a fixed time or based on monitoring output voltage VBUCK. At time T2, VBUCK PFM is disabled, and VBOOST PFM mode is enabled. In VBOOST PFM mode, power stages 10 cycles repeatedly through states 3-6 as discussed above. Voltage VBOOST stabilizes at a maximum boosted voltage just prior to time T3. At time T3, power stages 10 transitions from VBOOST PFM mode to PWM mode. A PWM clock labeled PWM CLOCK, generated by controller 42 in FIG. 1, provides timing based on received clock signal CLOCK. As illustrated, output voltage VBOOST is already at the maximum when PWM mode is entered. PWM mode is illustrated in FIG. 5 and in FIGS. 13-15.

Figure 18:
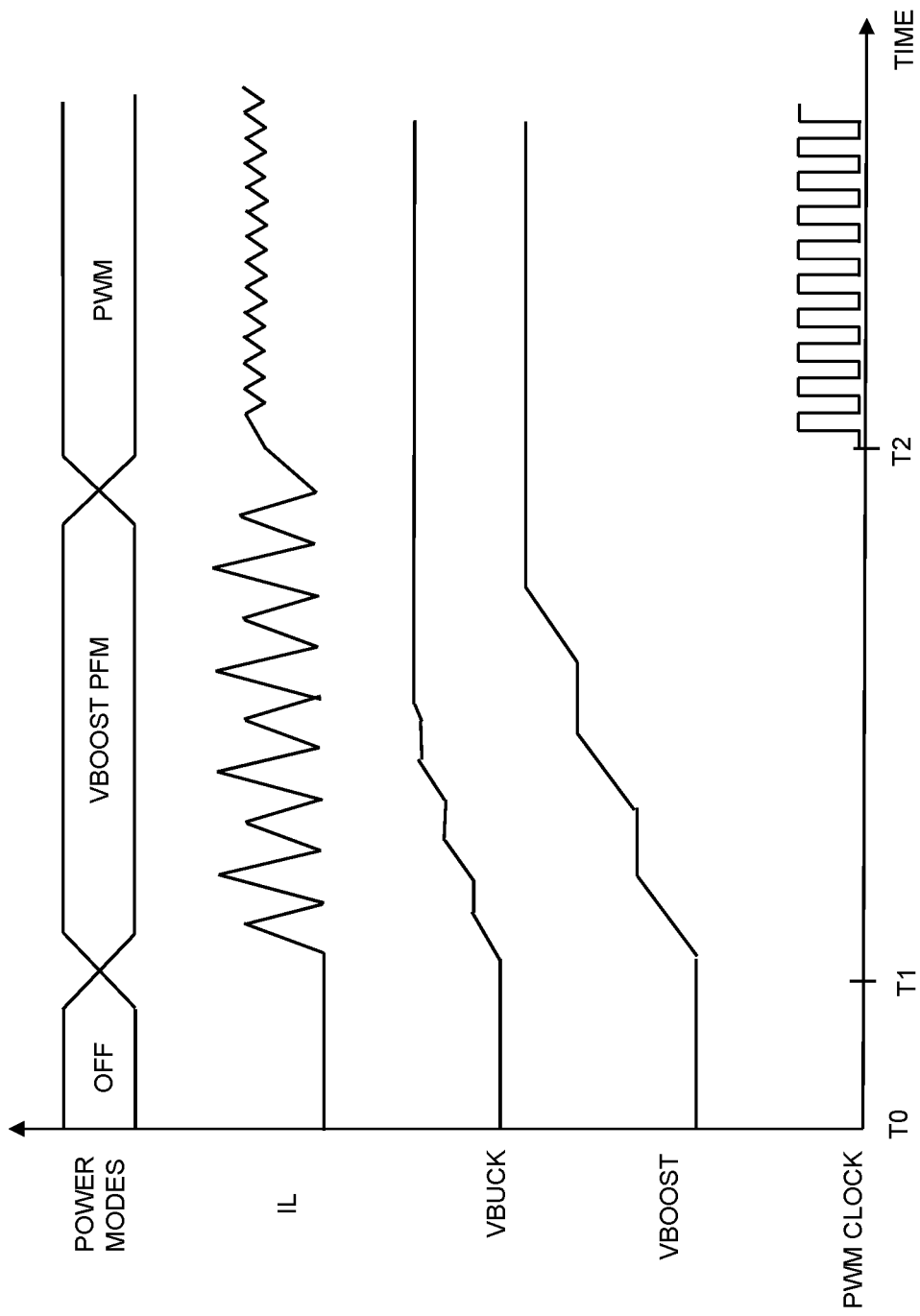
FIG. 18 illustrates waveforms of various signals useful for illustrating the soft starting method for operation in PWM mode in accordance with another embodiment.

FIG. 18 illustrates waveforms of various signals useful for illustrating the soft starting method for operation in PWM mode in accordance with another embodiment. In FIG. 18, the soft starting method uses only the VBOOST PFM instead of both the VBUCK PFM and VBOOST PFM modes as illustrated above in FIG. 17. Between times T0 and T1, power stages 10 are OFF. At time T1, VBOOST PFM mode starts. The states of VBOOST PFM mode may be repeated, if necessary, between time T1 and T2. FIGS. 9-12 show the states of VBOOST PFM mode. The time interval between times T1 and T2 may be determined to allow the output voltage and current to stabilize and may be either a fixed time or based on monitoring output voltage VBOOST. At time T2, power stages 10 transitions from VBOOST PFM mode to PWM mode. A PWM clock labeled PWM CLOCK, generated by controller 42 in FIG. 1, provides timing based on received clock signal CLOCK. As illustrated, output voltage VBOOST is already at the maximum when PWM mode is entered. PWM mode is illustrated in FIG. 5 and in FIGS. 13-15.

The start-up method results in the current in the inductor ramping up more gradually and limiting the inrush current, thus reducing the likelihood of an overcurrent, overvoltage, or overstress condition in both regulated outputs of the power stages of the SIMO power supply. Also, start-up in PFM mode does not require the use of a clock signal like that required for PWM mode. Starting in PFM mode avoids a potential stability issue. In addition, power efficiency is optimized during start-up in PFM mode at relatively light load to move the states progressively to PWM mode for operation at maximum output power.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A method for soft starting a single inductor multiple output (SIMO) power supply, the method comprising:
   selecting a pulse width modulation (PWM) mode;
   enabling a first pulse frequency modulation (PFM) mode in the SIMO power supply;
   supplying a first load with a first voltage while in the first PFM mode;
   disabling the first PFM mode;
   enabling the PWM mode in the SIMO power supply; and
   operating the SIMO power supply in the PWM mode, wherein after disabling the first PFM mode and prior to operating the SIMO power supply in the PWM mode, selecting a second PFM mode and supplying the first load with the first voltage and a second load with a second voltage while in the second PFM mode.

2. The method of claim 1, further comprising controlling the SIMO power supply converter using a finite state machine.

3. The method of claim 1, wherein supplying the first load with the first voltage and the second load with the second voltage in the second PFM mode further comprises charging the single inductor through the first and second loads.

4. The method of claim 1, wherein supplying the first load with the first voltage and a second load with a second voltage in the second PFM mode further comprises:
   charging the single inductor in the second PFM mode;
   discharging the single inductor through the first load in the second PFM mode;
   recharging the single inductor in the second PFM mode; and
   discharging the single inductor in the second PFM mode though the second load.

5. The method of claim 1, wherein the second voltage is higher than the first voltage.

6. The method of claim 5, wherein the second voltage is higher than a supply voltage provided to the SIMO power supply and the first voltage is lower than the supply voltage.

7. The method of claim 6, further comprising providing the supply voltage from a battery.

8. The method of claim 1, wherein operating the SIMO power supply in the PWM mode further comprises providing a clock in PWM mode.

9. A method for soft starting a single inductor multiple output (SIMO) power supply, the method comprising:
selecting a pulse width modulation (PWM) mode;
enabling a first pulse frequency modulation (PFM) mode;
charging the single inductor in the first pulse frequency modulation (PFM) mode;
discharging the single inductor through a first load in the first PFM mode;
recharging the single inductor in the first PFM mode;
discharging the single inductor in the first PFM mode through though a second load;
disabling the first PFM mode;
enabling the PWM mode after disabling the first PFM mode; and
operating the SIMO power supply in the PWM mode,
wherein before enabling the first PFM mode, enabling a second PFM mode, the second PFM mode comprising:
charging the single inductor through the first and second loads at the same time, and
discharging the single inductor through the first and second loads at the same time.

10. The method of claim 9, further comprising controlling the SIMO power supply using a finite state machine.

11. The method of claim 9, wherein operating the SIMO power supply in the PWM mode further comprises:
charging the single inductor to a first current in the PWM mode; and
sequentially discharging the single inductor from the first current to a second current through the first load and then through the second load.

12. The method of claim 9, further comprising providing a supply voltage to the SIMO power supply from a battery.

13. The method of claim 9, wherein the steps of charging the single inductor in the first PFM mode and discharging the single inductor through the first load in the first PFM mode further comprises repeating the steps of charging and discharging until a first voltage is reached.

14. The method of claim 9, wherein operating the SIMO power supply in the PWM mode further comprises providing a clock in PWM mode.

15. A method for soft starting a single inductor multiple output (SIMO) power supply, the method comprising:
selecting a pulse width modulation (PWM) mode;
enabling a first pulse frequency modulation (PFM) mode in the SIMO power supply;
charging a single inductor of the SIMO power supply through first and second loads at the same time while in the first PFM mode;
discharging the single inductor through the first and second loads at the same time while in the first PFM mode;
enabling a second PFM mode in the SIMO power supply after disabling the first PFM mode;
charging the single inductor in the second PFM mode;
discharging the single inductor through the first load in the second PFM mode;
charging the single inductor in the second PFM mode through the second load;
discharging the single inductor in the first PFM mode though the second load;
enabling the PWM mode after disabling the second PFM mode; and
operating the SIMO power supply in the PWM mode.

16. The method of claim 15, wherein the steps of charging and discharging in the first PFM mode further comprises repeating the steps until a first voltage is reached.

17. The method of claim 15, wherein enabling the first pulse frequency modulation (PFM) mode in the SIMO power supply further comprises:
charging a single inductor of the SIMO power supply through first and second loads at the same time while in the first PFM mode; and
discharging the single inductor through the first and second loads at the same time while in the first PFM mode.

18. The method of claim 17, wherein enabling the second PFM mode in the SIMO power supply after disabling the first PFM mode further comprises:
charging the single inductor in the second PFM mode;
discharging the single inductor through the first load in the second PFM mode;
charging the single inductor in the second PFM mode; and
discharging the single inductor in the first PFM mode though the second load.

* * * * *